United States Patent [19]

Stratford et al.

[11] 4,143,794

[45] Mar. 13, 1979

[54] FLUID DISPENSING DEVICE

[75] Inventors: Michael G. Stratford, Tring, England; Ronald H. D. F. Lee, deceased, late of Berkhamsted, England, by Angel J. Lee, executor

[73] Assignee: Burroughs Wellcome Co., Research Triangle Park, N.C.

[21] Appl. No.: 819,865

[22] Filed: Jul. 28, 1977

[51] Int. Cl.² .......................... B67D 5/22; B65G 59/00
[52] U.S. Cl. ........................................ 222/42; 222/48; 222/205; 222/207
[58] Field of Search ............... 222/205, 207, 211, 212, 222/215, 42, 48, 50, 427, 430, 434, 438, 439, 440, 456

[56] References Cited

U.S. PATENT DOCUMENTS

| 2,730,270 | 1/1956 | Heinemann | 222/207 X |
| 3,089,623 | 5/1963 | Padzieski | 222/215 X |
| 3,171,446 | 3/1965 | Koch | 222/434 X |
| 3,921,860 | 11/1975 | Zackheim | 222/207 |

Primary Examiner—Allen N. Knowles
Attorney, Agent, or Firm—Donald Brown

[57] ABSTRACT

A dosing device for fluid which comprises a dip tube extension situated within a dosage cup, the extension being constructed to enable fluid to pass from within said extension into the dosage cup and a dosage determining sleeve slidably engaging a side wall of the extension and movable relative to the extension between positions enabling retention within said cup of a selected dosage volume of fluid and return of any excess fluid into said extension.

8 Claims, 4 Drawing Figures

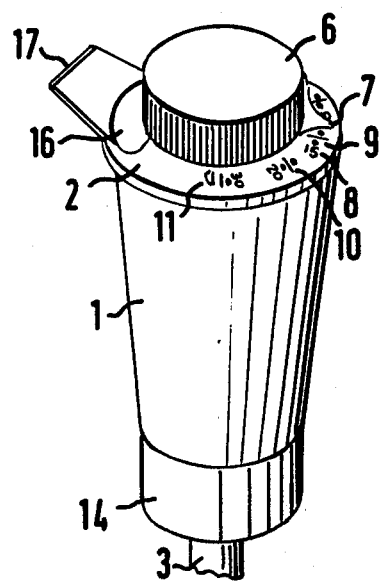
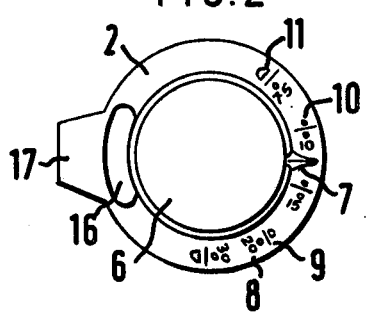
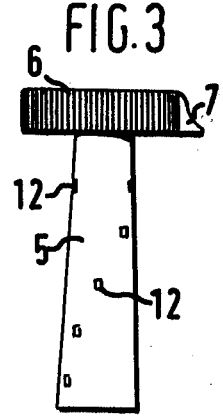
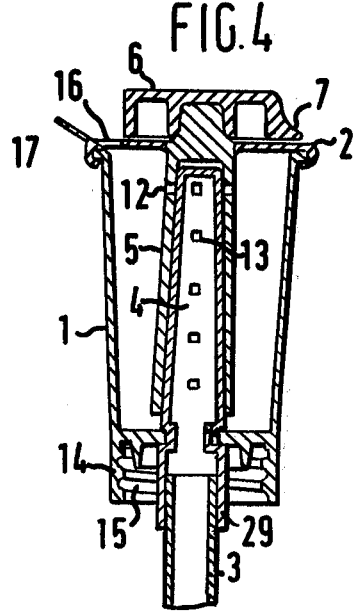

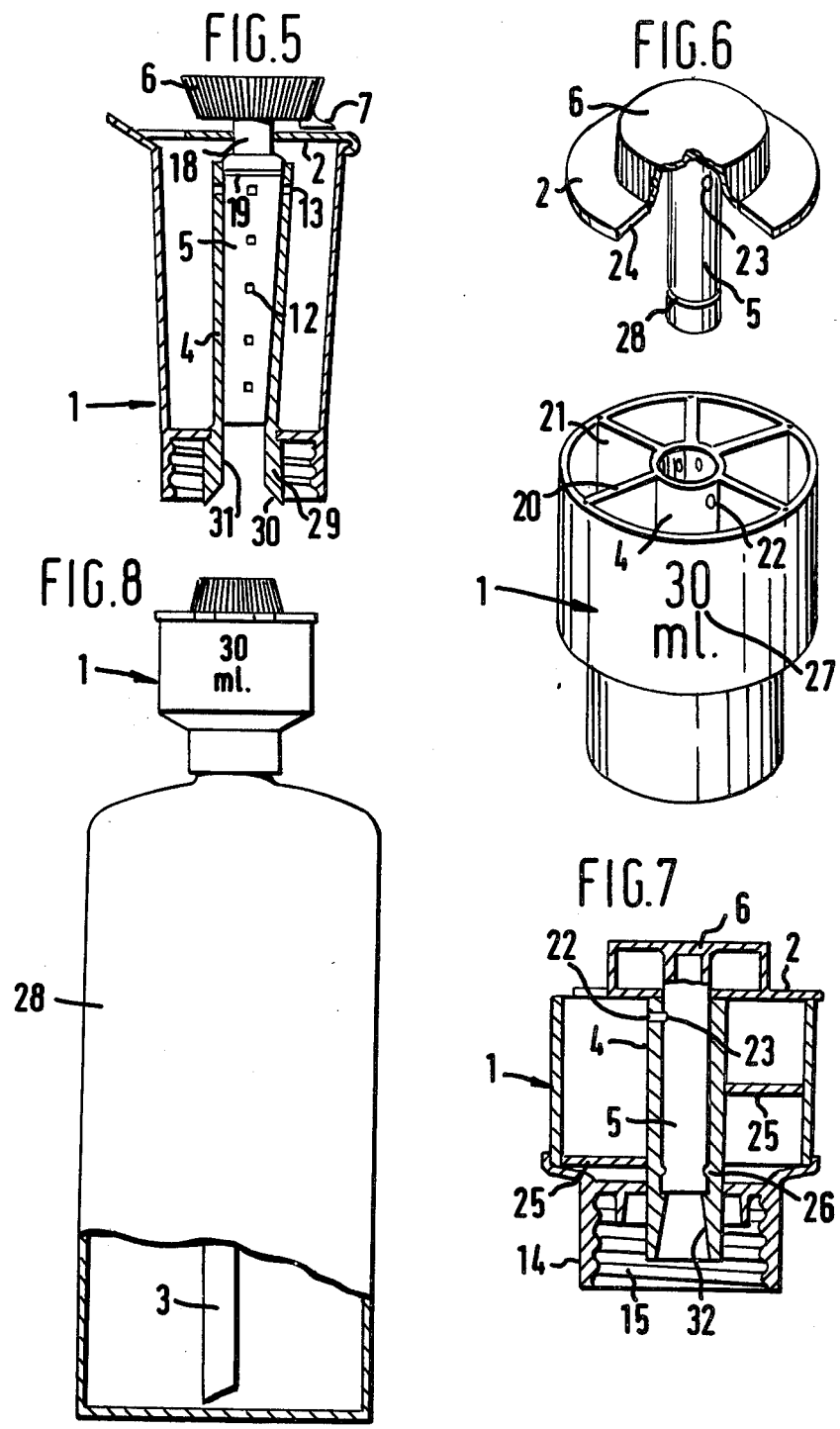

FLUID DISPENSING DEVICE

A fluid dispensing device in the form of a dosage cup for attachment to a flexible container of fluid. The device provides selected dosage volumes of fluid for application to animals or for dispensing detergents, weed killers and the like.

This invention is concerned with dosing devices for dispensing fluids in the form of liquids or powders in measured doses. Such devices are particularly suitable for the application of liquid or powdered medicaments to animals but could equally well be used for such purposes as dispensing unit doses of detergents, weed killers and substances for plant treatment such as hormones or insecticides.

For application to animals the main use is for dispensing insecticides or anthelmintics onto the backs of animals such as cattle and sheep. Many medicaments are absorbed through the skin on dermal application and the accuracy of dosage is usually important to ensure that adequate treatment is effected without causing serious side effects to the animals being treated.

It is an object of this invention to provide a dosing device which can be used easily to provide a reasonably accurate dose of a fluid for subsequent application where required.

Accordingly this invention provides a dosing device for fluids comprising a dip tube or engagement means therefor, an extension leading therefrom and situated within a dosage cup, the extension being constructed to enable fluid to pass from within said extension into the dosage cup, and dose determining means slidably engaging a side wall of the extension and movable relative to the extension between positions enabling retention within said cup of a selected dosage volume of fluid and return of any axcess fluid into said extension.

In a preferred embodiment the extension has a series of apertures at positions in the side wall thereof, associated with mutually different dosage volumes within the dosage cup, and the dose determining means is slidably arranged for selective uncovering of an aperture at a desired position to enable fluid to be passed from the extension into the dosage cup through the selected aperture. Ideally, the dose determining means comprises a dose adjustment sleeve in intimate contact with the dip tube extension and provided with at least one outlet such that the adjustment sleeve may be moved relative to the dip tube extension to align selectively an outlet with an aperture at one desired position. The sleeve may be located inside or outside the dip tube extension, as required.

If such a devise is attached to a flexible container of the fluid to be dispensed, after the device has been set to the required dose, the container is squeezed to cause the fluid to pass up through the dip tube and into the dosage cup through the aligned outlet and aperture until the level of fluid in the cup is above that necessary for the selected dosage volume. When the container is released the excess fluid in the cup is drawn back into the dip tube until the correct level is achieved whereupon air passes into the dip tube to replace the volume of fluid remaining in the cup. Thus an accurate dose is assured even if an excess quantity of fluid passes initially through the dip tube into the cup.

In a preferred arrangement of the device the apertures in the dip-tube extension are provided at longitudinally spaced positions and the adjustment sleeve is provided with a series of outlet holes which are at the same longitudinally spaced positions as the apertures but which are circumferentially displaced with respect to the positions of the apertures, the sleeve being rotatable, relative to the dip tube extension, to align selectively an outlet hole with an aperture at the respective longitudinally spaced positions. As an alternative the adjustment sleeve could be provided with a hole or holes at one level only, the sleeve being pulled upwardly of the dip tube so as to register successively with the apertures therein, although this does present difficulties in providing an adequate seal.

Preferably the apertures are longitudinally aligned and provided in pairs (ideally diametrically opposed) at each longitudinally spaced position and the adjustment sleeve is provided with corresponding outlet holes to align with each respective pair of apertures.

In an alternative preferred arrangement of the device, the dosage cup is divided into a number of discrete compartments providing the mutually different dosage volumes and there is an aperture associated with each compartment. The divisions between the compartments most desirably are in the form of radial partitions and variation in volumes between the compartments may be achieved in a variety of ways. Thus the rotational angular spacing of the partitions could be varied, or vertical spacers, at differing radially disposed positions, could be fitted in the compartments to interconnect the two partitions forming each respective compartment. The partitions could also have sloping walls or walls of varying thicknesses, as could the outer cup wall forming part of each compartment. Ideally, however, the rotational angular spacing of the partitions will be constant throughout, so as to provide compartments whose horizontal cross-sectional areas are equal, the different dosage volumes being achieved by providing that the compartments have mutually different depths.

In this arrangement the dose determining means is preferably provided by a rotatable sleeve, within the extension, and having a single hole which can be registered successively with each of the apertures.

It is preferred in all embodiments that the dosage cup should be closed by a cover through which the adjustment sleeve projects. The cover is normally provided with an opening for the dispensing of fluid from the cup and ideally a pouring spout is located on the cover adjacent to the opening.

With the preferred form of adjustment sleeve, which is rotated between the various dosage positions, the adjustment sleeve is advantageously provided with a pointer which rides over a dosage scale on the cover, marks on the scale corresponding to positions whereby alignment of an outlet with an aperture will occur. The cover can be provided with locating pips to locate the pointer onto any selected mark on the scale. Ideally end stops are provided at either end of the scale to prevent the pointer moving beyond the two ends of the dosing scale.

In all embodiments the sleeve and co-extending extension may be tapered longitudinally and preferably will taper inwardly towards the dip tube or engagement means therefor, if the sleeve is disposed within the extension. It is of advantage for the dosage cup outer wall to be formed parallel to any tapered sleeve or extension wall.

If the dosage cup is formed from a translucent or transparent material, the user can see when an adequate quantity of fluid has passed into the cup. In the embodiment wherein dosages are determined by different heights in the dosage cup, graduations can be provided on the dosage cup outer wall corresponding to the level of each aperture in the dip tube extension.

It is preferred that the dosage cup should be provided with integral locating means, such as a screw-threaded portion or attachment clips whereby it may be affixed to a container of fluid.

The dosing device may also include a dip tube either independent from or attached to the dip tube engagement means (such as by a friction fit or glueing).

The invention also extends to the combination of a flexible container for fluid to which the dosing device as hereinbefore defined has been affixed and further to such a combination with a treatment fluid disposed within the container ready for dispensing.

The invention may be performed in various ways and preferred embodiments thereof will now be discribed, by way of example, with reference to the accompanying drawings, in which:

FIG. 1 is a perspective view of a dosing device constructed in accordance with this invention;

FIG. 2 is a plan view of the device shown in FIG. 1;

FIG. 3 is a side view of a dose adjustment sleeve forming part of the device shown in FIG. 1;

FIG. 4 is a vertical cross section through the device shown in FIG. 1;

FIG. 5 is a view similar to that of FIG. 4 showing a modification to the device;

FIG. 6 is an exploded view of an alternative embodiment of dosing device constructed in accordance with the invention;

FIG. 7 is a vertical cross-section through the device illustrated in FIG. 6; and FIG. 8 illustrates the device of FIGS. 6 and 7 attached to a container and ready for use.

The dosing device illustrated in FIGS. 1 to 4 of the drawings comprises a dosage cup 1 closed by a cover 2 which has been welded or glued into a definite position relative to the cup. A dip tube 3, extending downwardly from the cup 1, has an upward extension 4 which projects into the cup 1. Located over this extension 4 is a dose adjustment sleeve 5 provided with a head 6 which has been welded or glued onto the sleeve 5 in a definite position relative thereto (with respect to outlet holes 12 in the sleeve) during the assembly process and which carries a pointer 7. The pointer 7 is movable across a scale 8 on the cover 2 and may be located at a desired scale mark 9 by locating pips 10. End stops 11 prevent rotation of the pointer, and the associated sleeve 5, beyond the ends of the scale 8. As the pointer registers at each scale mark 9 a pair of diametrically opposed outlet holes 12 in the sleeve 5 will register with a pair of apertures 13 in the extension 4. As can be seen from FIGS. 3 and 4 the apertures 13 are longitudinally aligned, whereas the pairs of outlet holes 12 are equiangularly spaced around the circumference of the sleeve 5 but at the same longitudinal spacing as the apertures 13. Thus only one pair of holes 12 will register with a pair of apertures 13 as the pointer 7 locates over one of the scale marks 9. Because the holes 12 and apertures 13 are in pairs, the scale 8 must not extend beyond 180° and the end stops 11 prevent undesirable rotation of the pointer 7.

The lower portion 14 of the body incorporating the cup 1 is formed with an internal screw-thread whereby it may be attached to the screw-threaded neck of a flexible container containing a liquid or powder to be dispensed. The required dosage of the substance to be dispensed is chosen by locating the pointer 7 over one of the scale marks 9 and the container is then squeezed to cause the liquid or powder to pass up the dip tube 3 and into the cup 1 through the aligned apertures 13 and outlet holes 12 until the material within the cup reaches a level above that of the aligned holes and apertures. When the container is released excess material is drawn back into the dip tube 3 until the required level is achieved whereupon air passes into the dip tube 3 to replace the volume of material which remains in the cup 1 and which comprises an accurate measured dose of the material to be dispensed. The device is then tipped so that the material in the cup 1 passes through the opening 16 to be directed by the pouring spout 17 onto, for instance, the back of an animal being treated.

Whilst the operator of the device can view the material filling the cup 1 through the opening 16 until a desired level is reached, it is preferred that the outer wall of the cup 1 should be formed from a transparent or translucent material so that the level of material in the cup 1 can be seen more readily. In this case graduations with dosage markings corresponding to those associated with each of the scale marks 9 can be printed, or otherwise formed, on the cup wall to indicate the different desired levels within the cup as an aid to the operator of the device to enable him to determine when the minimum level of initial filling by squeezing has been reached.

In the modified device illustrated in FIG. 5 the extension 4 is formed with a taper in the opposite direction to that shown in FIG. 4 and in this case surrounds the sleeve 5 which is tapered in a similar manner. The top end of the sleeve 5 is provided with a neck 18 passing through a hole in the cover 2 and has the head 6 mounted thereon. The head 6 in this case is tapered inwardly (towards the cover 2) so that it can be gripped by the fingers and pulled upwardly (thus causing the cover 2 to bow outwardly slightly) as a means of releasing the sleeve should it tend to stick within the extension 4. The resilience of the cover 2 will return the sleeve into close engagement with the extension 4 to prevent leaking of fluid. A resilient sealing ring 19 is provided at the top end of the sleeve 5 for additional leak resistance. The arrangement shown in FIG. 5 has certain advantages as compared with that shown in FIG. 4, the main one being that problems of suck-back are substantially avoided. With the arrangement of FIG. 4, when the container of fluid is released following the operation of filling the cup 1, it is possible for the immediate differences in pressure to cause fluid in the cup 1 to be drawn round the bottom edge of the sleeve 5 and through one of the lower holes 13 into the extension 4. Also the arrangement of FIG. 5 provides simple means of freeing the sleeve 5 if it sticks. Furthermore since the wall of the extension 4 is now parallel with the outer wall of the cup 1, differences in volume between the levels determined by the holes 12 will be directly proportional to their longitudinal spacing. FIG. 5 also illustrates dip tube engagement means 29 in the form of an inwardly tapered mouth 30 which directs the dip tube into the restricted passageway 31 where it will be a tight fit. If required, the dip tube could be glued in position there permanently. FIG. 4 shows the dip tube positioned in the passageway 30 of the engagement means 29.

An alternative form of device is shown in FIGS. 6 and 7. In this case the cup 1 is divided by a number of equi-angularly spaced radial partitions 20 to form discrete compartments 21 each of which communicates with the interior of the extension 4 via a respective aperture 22, all of which are arranged on a single circumference. A hollow sleeve 5 is again disposed within the extension 4 and has a single hole 23 which can register with any one of the apertures 22, upon rotation of the sleeve 5 by gripping the head 6. This head 6 is integral with the cover 2 and has an opening 24 which will locate over the top of a compartment 21 which is interconnected with the interior of the sleeve 5 by alignment of the hole 23 and the appropriate aperture 22. Each of the compartments 21 is provided with a fixed base plate 25 set at a height differing from the heights of the other base plates so that the compartments provide mutually different dosage volumes.

The device shown in FIGS. 6 and 7, when attached to a container of fluid, is operated in a manner similar to that described in connection with the device of FIGS. 1 to 4. However since all the apertures 22 and the hole 23 are set at the same height there is no possibility of suckback of fluid from positions below the apertures 22. The apertures 22 can be set at the centre of a segment but it is preferred that they should be positioned adjacent to one of the partitions 20, as shown, since the fluid flow then tends to run down the partition wall thus minimising the possibility of spraying the fluid out through the opening 24 in the cover 2.

As shown in FIGS. 6 and 7 the end of the sleeve 5 is formed with a groove 28 which is a snap fit onto an inner moulded ring 26 of the extension 4. Below this there is provided the lower portion 14 formed with a screw-thread 15. The extension 4 also has a tapered mouth 32 to receive the dip tube 3 and again the dip tube 3 may be glued in position for greater security. Preferably the outer wall of the cup 1 is formed of translucent material (to enable the user to see when any compartment has been filled) and carries dosage scale marks 27.

FIG. 8 shows the device of FIGS. 6 and 7, with a dip tube 3 attached thereto, screwed onto the neck of a flexible contained 28 so that the dip tube extends towards the base thereof. The devices shown in FIGS. 1 to 4 and 5 would be mounted in a similar manner. These devices provide a means of dispensing accurate doses of fluids present in the contained 28 without spillage thus preventing waste and toxic contact with the user. When the container is tipped to dispense a measured dose from the cup 1 the free end of the dip tube 3 will be uncovered. In this position fluid cannot flow from the body of the container down the dip tube into the cup, and any liquid already present in the dip tube will be held by surface tension at the outlet hole in the sleeve 5 and the aperture in the extension 4.

The device is ideally made from a thermoplastic material such as polyethylene or polyvinyl chloride and thermosetting materials such as resins or polymethyl methacrylate could also be used. Other possible materials, particularly for the sleeve 5 and extension 4 are nylon especially or polytetrafluoroethylene which have good self-lubricating properties. The materials should be chosen so that they do not react with chemicals which are to be dispensed and are substantially impermeable thereto.

Various modifications may be made to the devices other than those as illustrated in the drawings. Thus, for example, the sleeve 5 of FIG. 3 could have the holes 12 joined in a continuous spiral slot or alternatively the apertures 13 in the extension 4 could form a continuous longitudinal slot. In the device shown in FIGS. 6 and 7 the head 6 could be omitted since the extending edge of the cover 2 could be gripped for rotation. In such an arrangement, the cover 2 could be formed to extend downwardly as a skirt around the dosage cup outer wall. A cut-out could be formed in the skirt so that, as the cover 2 is rotated, the cut-out successively uncovers a scale mark on the cup outer wall corresponding to a dosage volume to be dispensed when the cover 2 is in that position. In all the embodiments the screw-threaded portion 14 could be replaced by attachment clips which will hold the device onto a container in a fluid-tight manner. Also various forms of dip tube engagement means may be employed; for example, the engagement means could be formed so that the dip tube is a push-fit onto the outside thereof. As another possibility the engagement means comprises a flange shaped to engage a corresponding flange on the dip tube, the two flanges abutting and providing a fluid tight seal when the dosing device is located on a container of fluid.

In a further aspect this invention provides a dosing device for fluids comprising a dip tube or engagement means therefor, an extension leading therefrom and situated within a dosage cup, the extension being constructed to enable fluid to pass from within said extension into the dosage cup, and dose determining means slidably engaging a side wall of the extension and movable relative to the extension between positions enabling retention within said cup of reselected, mutually different dosage volumes of fluid and return of any excess fluid into said extension.

We claim:

1. A dosing device for fluids which comprises a dosage up a dip tube having an extension situtated within the dosage cup, the extension being constructed to enable fluid to pass from within said extension into the dosage cup, and dose determining means slidably engaging a side wall of the extension and movable relative to the extension between positions enabling retention within said cup of a selected dosage volume of fluid and return of any excess fluid into said extension.

2. A dosing device according to claim 1 wherein the extension has a series of apertures at positions in the side wall thereof associated with mutually different dosage volumes within the dosage cup, and the dose determining means is slidably arranged for selective uncovering of an aperture at a desired position to enable fluid to be passed from the extension into the dosage cup through the selected aperture.

3. A dosing device according to claim 2 wherein the dose determining means comprises a dose adjustment sleeve in intimate contact with the dip tube extension and provided with at least out outlet such that the adjustment sleeve may be moved relative to the dip tube extension to align selectively an outlet with an aperture at one desired point.

4. A dosing device according to claim 3 wherein apertures in the dip-tube extension are provided at longitudinally spaced positions and the adjustment sleeve is provided with a series of outlet holes which are at the same longitudinally spaced positions as the apertures but which are circumferentially displaced with respect to the positions of the apertures, the sleeve being rotatable, relative to the dip tube extending, to align selectively an outlet hole with an aperture at the respective longitudinally spaced positions.

5. A dosing device according to claim 2 wherein the dosage cup is divided into a number of discrete compartments providing the mutually different dosage volumes and there is an aperture in the dip tube extension associated with each compartment.

6. A dosing device according to claim 3 wherein the dosage cup is closed by a cover through which the adjustment sleeve projects and the adjustment sleeve is provided with a pointer which rides over a dosage scale on the cover, marks on the scale corresponding to positions whereby alignment of an outlet with an aperture will occur.

7. A dosing device according to claim 1 comprising a dip tube, the dip tube extension leading from the dip tube.

8. A dosing device according to claim 1 comprising a dip tube engagement means, the dip tube extension leading from the dip tube engagement means.

* * * * *